Oct. 7, 1930.                M. K. PARKHURST                1,777,623
                        FASTENING FOR JIGGING CONVEYERS
                        Filed Aug. 12, 1927      2 Sheets-Sheet 1
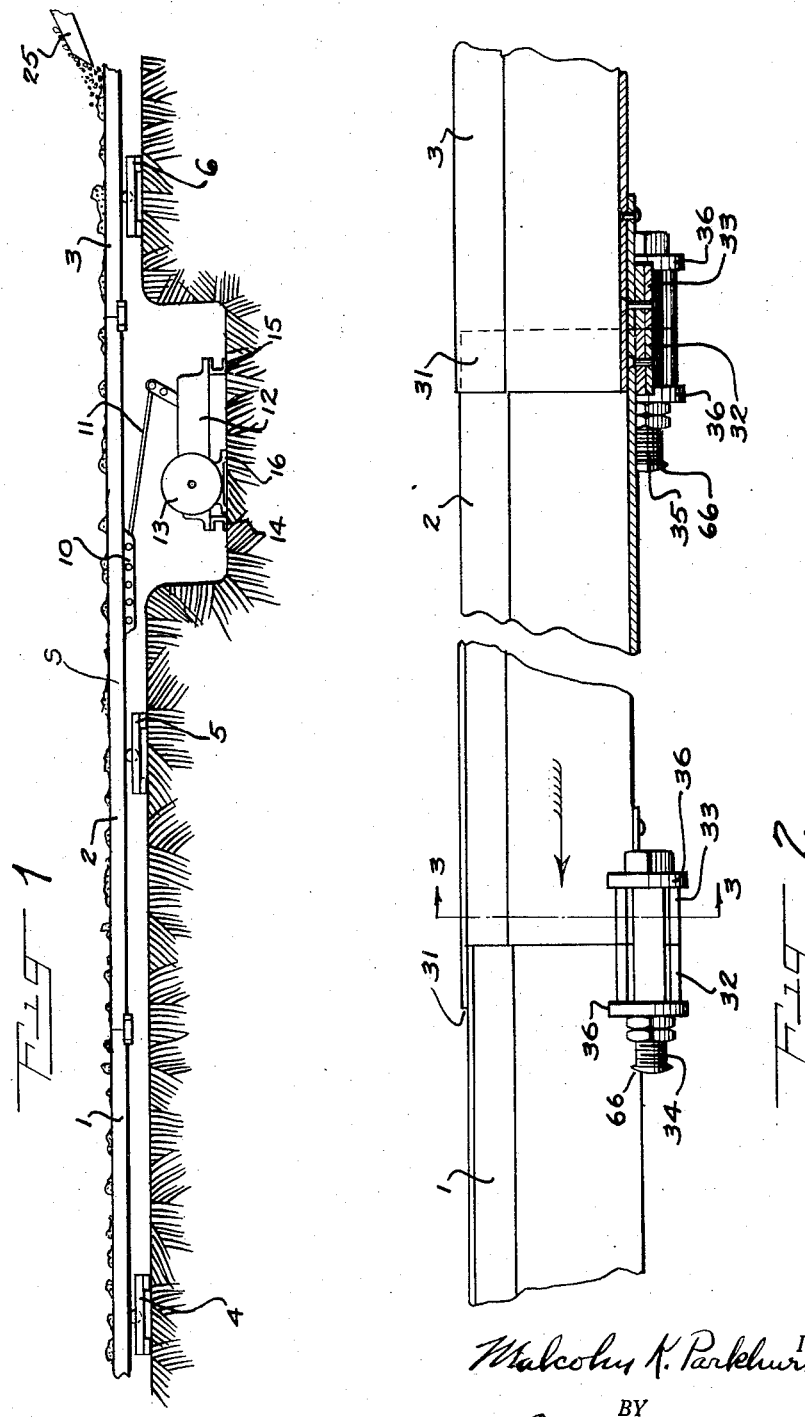
Malcolm K. Parkhurst INVENTOR.
BY
Thomas Howe ATTORNEY.

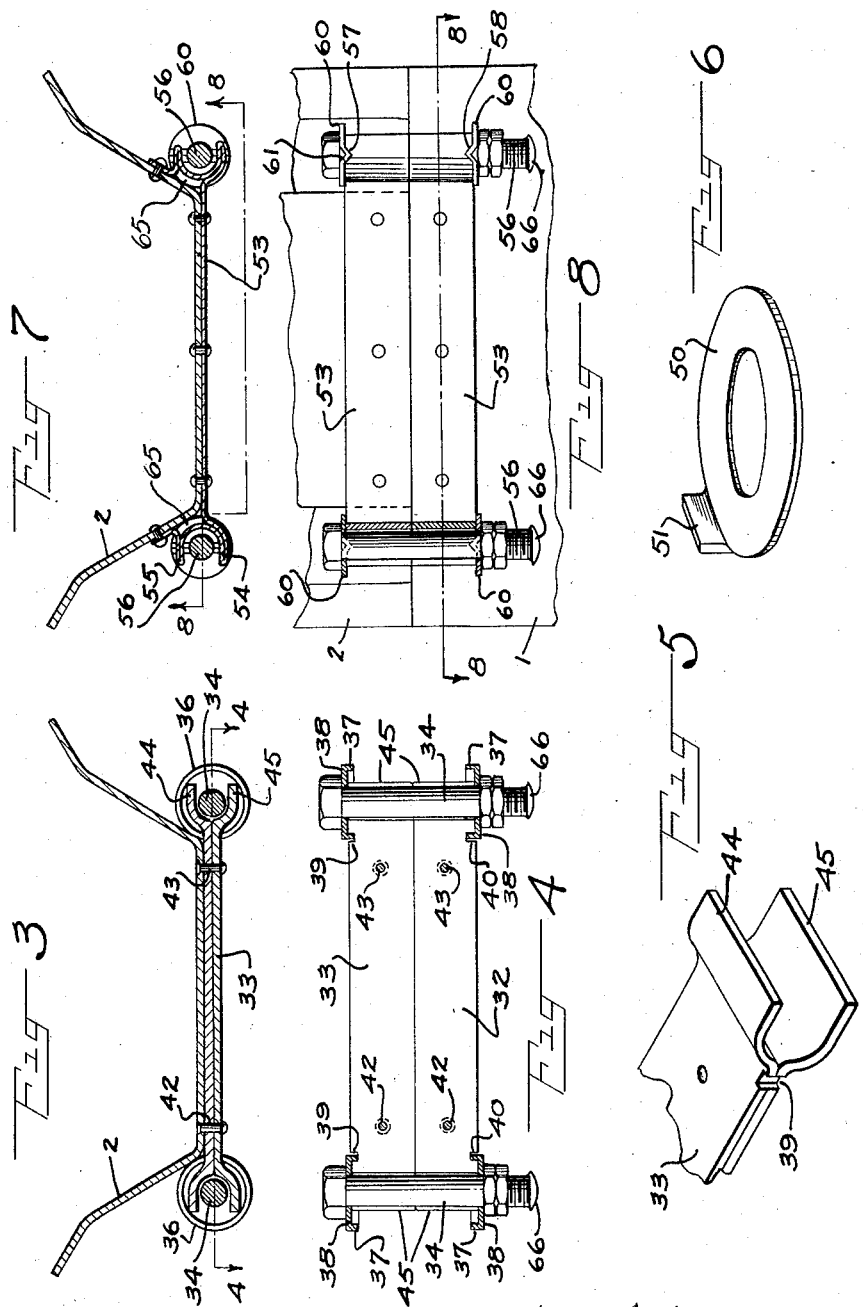

Patented Oct. 7, 1930

1,777,623

UNITED STATES PATENT OFFICE

MALCOLM K. PARKHURST, OF NEW YORK, N. Y.

FASTENING FOR JIGGING CONVEYERS

Application filed August 12, 1927. Serial No. 212,429.

This invention relates to conveyers for ore, coal, gravel, etc. in which it is desired to move large quantities of material from one place to another, as for instance from a car to a storage bin. In such cases there frequently arises a necessity to move the conveyer or chute from one place to another and increasing or decreasing its length to suit the occasion.

This invention, therefore, has for its object the provision of means whereby the chute of a conveyer and more particularly of what is commonly known as a jigging conveyer may be readily and efficiently assembled, disassembled, lengthened, shortened or any other adjustment accomplished through the actuation of a simple locking means which is so arranged as to prevent separation or loss of any of the parts.

Another object is to provide an effective lock between the sections of the chute of a conveyer which may be actuated with a minimum of effort and expenditure of time.

A still further object is to provide a chute for a jigging conveyer or the like which is readily detachable but at the same time will withstand the shocks and abuse incident to the use of the chute in transporting materials of the nature above mentioned.

Another object is to provide a sectional chute with special clamping brackets for connecting the various sections, one with another in a more advantageous manner for the purpose of resisting strains set up in use.

A further object is to construct a bracket which is adapted for use with a conveyer chute for coupling various sections of the chute together and for ensuring against dislocation of the various parts.

Further and more definite objects will appear from the following specification, claims and drawings, in which, Fig. 1 shows a conveyer, more particularly known as a "jigger conveyer" in connection with which my improvement is described;

Fig. 2 shows an enlarged portion of my improved chute, the ends being broken away, and partly in section;

Fig. 3 shows a cross section along the line 3—3 of Fig. 2, indicating the relations of the parts of the chute with relation to the clamping means;

Fig. 4 shows a sctional view along the lines 4—4 of Fig. 3, indicating the position taken by the lock washers;

Fig. 5 indicates a detail view of an end of one of the brackets which is permanently secured to each end of every chute section;

Fig. 6 shows a modified form of washer for coacting with the bracket;

Fig. 7 shows a slightly different form, in section for the bracket taken along the line 8—8 of Fig. 8, and Fig. 8 shows another section of the brackets along the lines 8—8 of Fig. 7, the projecting parts of the chute being broken away.

Referring more particularly to these drawings, the chute S of Fig. 1 is assembled from a plurality of sections 1, 2, 3, etc. Each section is mounted by means of roller bearing slideways 4, 5 and 6, or otherwise upon supporting surfaces which may be the earth or other foundation. These slideways may be movably positioned in any location desired and secured by means of posts driven in the ground or bolts to a foundation.

The section 2 is provided with a connection brace 10 to which is connected the connecting rod 11 adapted to be actuated by the actuating mechanism 12 operated by the motor 13. The motor 13 and actuating mechanism 12 are securely anchored to a firm foundation through the mounting channels 14 and 15 and the motor plate 16. The motor shaft may be provided with a heavy fly wheel, if desired, to maintain the speed of the motor more nearly constant.

The chute, together with its driving mechanism may be so positioned that the section 3 will be directly under the discharge chute 25 from which slides the ore, coal or other material. The motor 13 having been started the whole chute S will be given an oscillatory or jigging action whereby it is moved slowly toward the left and quickly retracted to the right as by a sudden shock. This uneven action is accomplished by proper motion changing mechanism common in the art and not shown in detail.

It is apparent that this jigging action producing a sudden shock on the return stroke of the chute will thereby slide the material along the chute while on the forward stroke to the right, as seen in Fig. 1 and during the slow motion to the left will be effective to cause the material to be carried along with the chute. This sliding and carrying action continually taking place causes the material on the chute to travel to the left in the direction of the slow motion from the slide 25 into a suitable bin or other storage means at the other end.

During this action and particularly during the shock-like return stroke the chute is subject to great strain. It is desirable that it be made as rigid, strong and light as possible. The parts must be firmly clamped together to prevent independent movement, otherwise a breakage of the chute will result. In order that the chute may be changed from one location to another and easily adapted for use the parts must be easily disconnected and assembled. Not only does the action of the reciprocating mechanism make these requirements difficult but the constant reverberation of hard materials within the chute sets up very deleterious vibrations.

In Fig. 2 is shown an enlarged view of the chute S and the means for securing the various parts together. These trough-like sections, indicated by 1, 2 and 3 are reduced at one end 31 so that they will fit into the full sized end of the adjoining section. Brackets 32 and 33 are fastened, each to one of the adjoining ends. These are arranged with fastening bolts 34 and 35 each of which is provided with two dished locking washers 36.

The shape of these washers is more clearly shown in connection with Figs. 3 and 4. They are provided with a turned up collar 37 and a flat section 38. The brackets 32 and 33 have recesses 39 and 40 for accommodating the collars 37 thereby securely holding the bolt which passes through these washers, in place.

The brackets are formed of two similar parts maintained in relation with the chute by means of rivets 42 and 43 or other equivalent arrangement. It is desirable to have these rivets lie flush with the inner surface of the chute.

Th ends of the bracket parts are arranged with reversely bent and oppositely disposed terminals 44 and 45. This permits the bolts 35 to be inserted or withdrawn from the opening between these terminals as shown in Figs. 2, 3 and 5. If desired a washer 50, as shown in Fig. 6 may be used instead of those shown, having a tail 51 for inserting in the recesses 39 and 40.

Another bracket which has proven satisfactory may be formed of a single piece of sheet metal bent into the form shown at 53 and riveted onto the chute in the same way, having equivalent terminal portions 54 and 55 between which the bolt 56 may be positioned. This modified form of bracket 53 may be provided with notches 57 and 58 running across both the terminals 54 and 55. Washers 60 having projections 61 may then be slid onto the bolt 56. The bolt on being tightened will be maintained in position through the coaction of the projections and notches.

The washer 50 may also be used to advantage with the type of bracket shown in Fig. 7. Two such washers are slid onto the bolt and the tails 51 will be inserted in the openings 65 between the brackets and the chute section. When clamped by tightening the bolts it will be impossible to displace them without rupturing the material from which they are made.

It can thus be seen that a simple means is provided for locking adjacent sections of the chute together. It may be noted that with the bolts and brackets positioned at the bottom of the chute and the upper parts of the chute having abutting edges, any force tending to bend the chute downwardly at the joints will be counteracted. Since there is no force tending to raise the chute along its unsupported parts no difficulty will be encountered from this. With the center line of the bolts directly at or slightly below the bottom edge of the chute the clamping force is applied at the most advantageous point and dirt or other materials which may accumulate in the joints will be prevented from working their way through the joints. It is preferable to arrange the chute so that the material transferred will flow from one section into the next into which the first section is fitted by means of its reduced portion.

With such an arrangement the sections of the chute may be readily added one to another or the chute disassembled for the purpose of changing its location or any other purpose without loss of time due to more complicated fastening devices. It is only necessary that the bolts be loosened without actually removing the nuts. The loosening need only be sufficient to permit the withdrawal of the collars 7 from the notches into which they fit. This is a particularly advantageous feature inasmuch as it is usually necessary to have two nuts on each bolt, one to serve as a locknut. To remove both these nuts would lead to their loss or misplacement, particularly in places where ore or other conveyors or chutes are used. To prevent this the ends of the bolts may be hammered over as at 66. Furthermore the construction of the brackets, bolts and washers is such as to prevent accidental separation of the parts through vibrations incident to their use.

The chute thus assembled may be used to transfer materials from a discharge slide to a storage bin, either up an incline or downwardly or one chute may feed into another of a series of such chutes where it is desired to transfer the materials over considerable distances.

I do not desire to be limited to the exact modification shown but only to the extent indicated within the spirit and scope of the appended claims.

I claim:

1. In a conveyer chute a plurality of sections, each section having brackets at its ends and being reduced at one end to such a dimension that the outside surface will fit within the inside of another section, said brackets being formed of sheet material having separated terminals and recesses and clamping means inserted between one set of terminals of each bracket of adjacent sections for clamping said sections together including retaining means insertable in said recesses for preventing displacement of said clamping means on both ends thereof.

2. In a jigging conveyer chute, a plurality of sections, brackets on the ends of each section consisting of two similar parts attached thereto in reversed position, said parts having offset ends between which a clamping bolt may be inserted and recesses in all of said brackets for retaining said clamping bolts in place.

3. In a jigging conveyer chute, a plurality of sections, brackets on the ends of each section consisting of two similar parts attached thereto in reversed position, said parts having offset ends between which clamping bolts may be inserted, clamping bolts for said brackets having washers on each end thereof, said washers having continuous right angle collars for cooperating with recesses arranged in all of said brackets, said clamping means thereby being detachable from the brackets only when released an appreciable distance at least the width of the collar on said washers.

In testimony whereof I have signed this specification this 8th day of August, 1927.

MALCOLM K. PARKHURST.